United States Patent
Yip et al.

(10) Patent No.: US 11,516,454 B2
(45) Date of Patent: Nov. 29, 2022

(54) METHOD AND DEVICE FOR TRANSMITTING INFORMATION ON THREE-DIMENSIONAL CONTENT INCLUDING MULTIPLE VIEW POINTS

(71) Applicant: Samsung Electronics Co., Ltd., Suwon-si (KR)

(72) Inventors: Eric Yip, Suwon-si (KR); Hyunkoo Yang, Suwon-si (KR); Youngwan So, Suwon-si (KR); Jaehyeon Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 16/981,119

(22) PCT Filed: Apr. 2, 2019

(86) PCT No.: PCT/KR2019/003864
§ 371 (c)(1),
(2) Date: Sep. 15, 2020

(87) PCT Pub. No.: WO2019/194529
PCT Pub. Date: Oct. 10, 2019

(65) Prior Publication Data
US 2021/0021798 A1 Jan. 21, 2021

Related U.S. Application Data

(60) Provisional application No. 62/679,375, filed on Jun. 1, 2018, provisional application No. 62/653,127, filed on Apr. 5, 2018.

(51) Int. Cl.
*H04N 13/178* (2018.01)
*H04N 13/194* (2018.01)
*H04N 13/282* (2018.01)

(52) U.S. Cl.
CPC ......... *H04N 13/178* (2018.05); *H04N 13/194* (2018.05); *H04N 13/282* (2018.05)

(58) Field of Classification Search
CPC . B60Q 1/46; B60Q 1/50; B60Q 1/525; B60Q 1/0023; B60Q 1/0088;
(Continued)

(56) References Cited

U.S. PATENT DOCUMENTS 9,836,885 B1   12/2017   Eraker et al.
2003/0107569 A1   6/2003   Endo et al.
(Continued)

FOREIGN PATENT DOCUMENTS

JP   2004-070608 A   3/2004
KR   10-2016-0018719 A   2/2016
(Continued)

OTHER PUBLICATIONS

Stockhammer et al., U.S. Appl. No. 62/567,661, filed Oct. 3, 2017. (Year: 2017).*
(Continued)

*Primary Examiner* — Christopher S Kelley
*Assistant Examiner* — Kathleen M Walsh
(74) *Attorney, Agent, or Firm* — Jefferson IP Law, LLP

(57) ABSTRACT

Provided is a method for transmitting metadata for omnidirectional content including a plurality of viewpoints. The method comprises identifying the metadata for the omnidirectional content including the plurality of viewpoints; and transmitting the identified metadata, wherein the metadata includes information about an identifier (ID) of a viewpoint group including at least one viewpoint of the plurality of viewpoints, and wherein the at least one viewpoint in the viewpoint group shares a common reference coordinate system.

16 Claims, 9 Drawing Sheets

(58) Field of Classification Search
CPC .......... B60Q 2300/314; B60Q 2300/43; B60Q
2300/45; B60Q 5/00; B60R 11/04; B60R
2011/0003; B60R 21/0134; G01S 13/58;
G08G 1/165; G08G 1/052; H04N 13/178;
H04N 13/194; H04N 13/282; H04N
13/111; H04N 21/21805; H04N
21/234345; H04N 21/23439; H04N
21/816; H04N 21/84; B60Y 2302/03;
G01C 21/26; G06V 20/52; G06V 20/58;
G06V 40/103
USPC .......................................................... 348/43
See application file for complete search history.

(56) References Cited

U.S. PATENT DOCUMENTS

| | | | | |
|---|---|---|---|---|
| 2011/0221861 | A1* | 9/2011 | Jeon | H04N 13/128 |
| | | | | 348/42 |
| 2011/0255592 | A1* | 10/2011 | Sung | H04N 13/111 |
| | | | | 375/E7.141 |
| 2016/0132991 | A1 | 5/2016 | Fukushi | |
| 2016/0205644 | A1 | 7/2016 | Seo et al. | |
| 2017/0359624 | A1* | 12/2017 | Englert | G06Q 20/123 |
| 2019/0045268 | A1* | 2/2019 | Veeramani | H04N 21/4383 |
| 2019/0104326 | A1* | 4/2019 | Stockhammer | H04N 21/816 |
| 2019/0238819 | A1* | 8/2019 | Furukawa | G06T 19/00 |
| 2019/0297132 | A1* | 9/2019 | Wang | H04L 65/752 |
| 2019/0306530 | A1* | 10/2019 | Fan | H04N 21/85406 |
| 2020/0120326 | A1* | 4/2020 | Deshpande | H04N 21/816 |
| 2020/0336803 | A1* | 10/2020 | Fan | H04N 21/8586 |
| 2021/0021806 | A1* | 1/2021 | He | H04N 21/21805 |
| 2021/0029294 | A1* | 1/2021 | Deshpande | H04N 5/23238 |
| 2021/0377571 | A1* | 12/2021 | Deshpande | H04N 19/174 |

FOREIGN PATENT DOCUMENTS

| | | |
|---|---|---|
| KR | 10-2016-0051740 A | 5/2016 |
| KR | 10-2017-0107719 A | 9/2017 |
| KR | 10-2018-0016805 A | 2/2018 |
| KR | 10-2018-0109655 A | 10/2018 |
| WO | 2017/142353 A1 | 8/2017 |
| WO | 2018/021067 A1 | 2/2018 |

OTHER PUBLICATIONS

Fan et al., U.S. Appl. No. 62/652,305, filed Apr. 3, 2018. (Year: 2018).*
Fan et al., U.S. Appl. No. 62/652,330, filed Apr. 4, 2018. (Year: 2018).*
Deshpande, U.S. Appl. No. 62/648,347, filed Mar. 26, 2018. (Year: 2018).*
Yuqun Fan (Huawei) et al: "[OMAF] On multiple viewing positions", 121. MPEG Meeting; 20180122-20180126 Gwangju; (Motion Picture Expert Group 0RIS0/IEC JTC1/SC29/WG11), No. m42049 Jan. 15, 2018 (Jan. 15, 2018), XP030070391, Retrieved from the Internet: URL:http://phenix.int-evry.fr/mpeg/doc_end_user documents/121 Gwangju/wgll/m42049-vl-m42049.zip m42049 I0MAF]0n multiple viewing positions.docx [retrieved on Jan. 15, 2018].
Extended European Search Report dated Feb. 25, 2021, issued in European Application No. 19782001.2.
European Office Action dated Sep. 20, 2022, issued in European Patent Application No. 19 782 001.2-1208.

* cited by examiner

METHOD AND DEVICE FOR TRANSMITTING INFORMATION ON THREE-DIMENSIONAL CONTENT INCLUDING MULTIPLE VIEW POINTS

CROSS-REFERENCE TO RELATED APPLICATION(S)

This application is a National Phase Entry of PCT International Application No. PCT/KR2019/003864, which was filed on Apr. 2, 2019 and claims priority to U.S. Provisional application No. 62/653,127 which was filed on Apr. 5, 2018, and United States Complete Patent Application No. 62/679,375 which was filed on Jun. 1, 2018 in the United States Patent and Trademark Office, the content of each of which are incorporated herein by reference.

BACKGROUND

1. Field

The present disclosure relates to a method and apparatus for transmitting information about three-dimensional (3D) content, and particularly, to a method and apparatus for transmitting metadata for 3D content including a plurality of viewpoints.

2. Description of the Related Art

The Internet is being evolved from a human-centered connection network over which people generate and consume information to the Internet of things (IoT) in which distributed elements such as things exchange and process information. The Internet of everything (IoE) is an example of convergence between big data processing and the IoT via a connection to a cloud server or the like.

To implement the IoT, technology elements such as sensing technology, wired and wireless communication, network infrastructure, service interfacing, and security are required. Recently, techniques such as sensor networks, machine-to-machine (M2M) communication, and machine type communication (MTC) are under study for connectivity between things.

In the IoT environment, an intelligent Internet technology (IT) service of creating new values to human living by collecting and analyzing data generated from connected things may be provided. The IoT may find its applications in the fields of smart homes, smart buildings, smart cities, smart cars or connected cars, smart grids, health care, smart appliances, and up-to-date medical services, through convergence between existing IT technologies and various industries. For IoT implementation, content has also been evolving. Along with the on-going evolution of black and white content to color content, high definition (HD) content, ultra high definition (UHD) content, and recent high dynamic range (HDR) content, driven by content distribution and standardization, virtual reality (VR) content reproducible on VR devices such as Oculus and Samsung's Gear VR is under development. A VR system refers to a system making interactions possible between a user and a content display device or a processing unit by monitoring the user, allowing the user to provide a feedback input to the content display device or processing unit by some kind of controller, and enabling the device or unit to process the input and adjust content accordingly.

A VR device may reproduce a three-dimensional (3D) image such as a spherical or cylindrical shape. The 3D image may be referred to as an omnidirectional image. The VR device is capable of displaying a specific area of the 3D image in consideration of a user's gaze direction or the like.

SUMMARY 3D content may include a plurality of viewpoints to provide a user with experience at various positions. Each of the plurality of viewpoints may correspond to a 3D image from the viewpoint. The VR device may display a 3D image viewed from a selected one of the plurality of viewpoints.

When switching occurs between the plurality of viewpoints, how to set a switched viewport may be an issue, and computations for viewport switching may be a load on the processor of the VR device.

The present disclosure is intended to provide a format of metadata for three-dimensional (3D) content to support easy switching between a plurality of viewpoints.

It will be appreciated by persons skilled in the art that the objects that could be achieved with the present disclosure are not limited to what has been particularly described hereinabove and the above and other objects that the present disclosure could achieve will be more clearly understood from the following detailed description.

In accordance with an embodiment of the present disclosure, a method for transmitting metadata for omnidirectional content including a plurality of viewpoints comprises identifying the metadata for the omnidirectional content including the plurality of viewpoints; and transmitting the identified metadata wherein the metadata includes information about an identifier (ID) of a viewpoint group including at least one viewpoint of the plurality of viewpoints, and wherein the at least one viewpoint in the viewpoint group shares a common reference coordinate system.

In accordance with another embodiment of the present disclosure, a method for processing information about omnidirectional content including a plurality of viewpoints comprises receiving the metadata for the omnidirectional content including the plurality of viewpoints; and processing media data for the omnidirectional content based on the received metadata, wherein the metadata includes information about an identifier (ID) of a viewpoint group including at least one viewpoint of the plurality of viewpoints, and wherein the at least one viewpoint in the viewpoint group shares a common reference coordinate system.

According to embodiments of the present disclosure, at least the following effects are achieved.

According to the present disclosure, a plurality of viewpoints included in three-dimensional (3D) content may be grouped and managed accordingly by means of provided metadata.

Further, according to the present disclosure, switching between a plurality of viewpoints included in 3D content may be supported by means of provided metadata.

That is, the present disclosure may provide a method of detecting defects in a remote radio head (RRH) which does not rely on thresholds and expert knowledge.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

Advantages and features of the present disclosure, and a method of achieving them will be apparent with reference to embodiments described below in detail together with the accompanying drawings. However, the present disclosure is not limited to the embodiments disclosed below, but may be implemented in various different forms. The embodiments are provided only to make the present disclosure comprehensive, and indicate the full scope of the disclosure to those skilled in the art. The present disclosure is only defined by the scope of the appended claims.

Although the terms, first, second, and so on are used to describe various components, they do not limit the components. These terms are used only to distinguish one component from another. Accordingly, it is obvious that a first component may be a second component within the technical spirit of the present disclosure.

Figure 1:
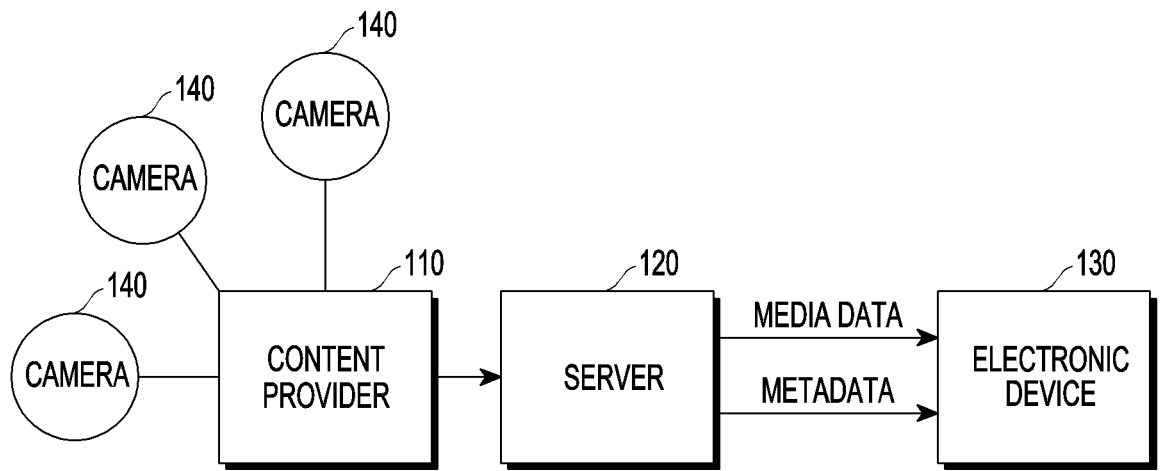
FIG. 1 is a block diagram illustrating a system according to an embodiment of the present disclosure.

FIG. 1 is a block diagram illustrating a system according to an embodiment of the present disclosure. The system according to the embodiment of the present disclosure may include a content provider 110, a server 120, and an electronic device 130.

The content provider 110 may generate three-dimensional (3D) content. The 3D content may include a plurality of viewpoints. The content provider 110 may generate the 3D content with a plurality of 3D images captured by a plurality of cameras 140. The locations of the plurality of cameras 140 may correspond to the plurality of viewpoints, respectively. In some embodiments, the locations of the plurality of viewpoints may be set arbitrarily. In some embodiments, the plurality of 3D images included in the 3D content may be generated virtually, not based on images captured by the plurality of cameras 140. The content provider 110 may transmit data of the 3D content to the server 120. In some embodiments, the content provider 110 may be configured as a server independent of the server 120. In some embodiments, the content provider 110 may be incorporated into the server 120.

The server 120 may transmit, to the electronic device 130, media data for the 3D content and metadata for the 3D content based on the data of the 3D content received from the content provider 110. The media data and the metadata may be transmitted independently. According to some embodiments, the media data and the metadata may be transmitted from individual servers.

The media data may include data of the plurality of 3D images included in the 3D content. The server 120 may generate two-dimensional (2D) images by projecting each of the 3D images (e.g., by equi-rectangular projection (ERP)). The server 120 may transmit, to the electronic device 130, data of the generated 2D images as the media data for the 3D content in conformance to a legacy protocol for transmitting data of a 2D image, such as MPEG. According to some embodiments, the media data may be generated by the content provider 110, and the server 120 may forward the media data generated by the content provider 110 to the electronic device 130.

The metadata may include information required to process the media data of the 3D content and reproduce the 3D content. According to embodiments of the present disclosure, the metadata may include information for grouping the plurality of viewpoints included in the 3D content, information for aligning the plurality of viewpoints, or information for supporting switching between the plurality of viewpoints. According to some embodiments, the content provider 110 may generate the metadata and provide the metadata to the server 120, and the server 120 may forward the metadata to the electronic device 130.

The electronic device 130 may reproduce the 3D content based on the received media data and metadata. According to some embodiments, the electronic device 130 may provide a signal for 3D content reproduction to another device capable of reproducing the 3D content, without directly reproducing the 3D content. The electronic device 130 may be a VR device or any device equipped with a display, which is capable of reproducing 3D content. According to some embodiments, the electronic device 130 may be a device capable of providing a signal for 3D content reproduction wiredly or wirelessly to a VR device or a device equipped with a display, which is capable of reproducing 3D content. For example, the electronic device 130 may be a smartphone, a television, a personal computer (PC), a laptop computer, a set-top box, or the like. The electronic device 130 may restore the 3D images from the data of the 2D images included in the media data to reproduce the 3D content or generate a signal for 3D content reproduction.

Figure 2:
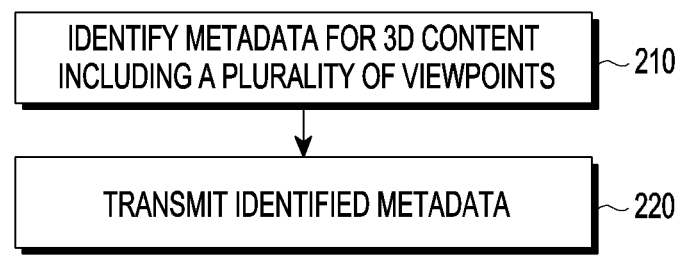
FIG. 2 is a flowchart illustrating an operation of a server according to an embodiment of the present disclosure.

FIG. 2 is a flowchart illustrating an operation of a server according to an embodiment of the present disclosure. The server described with reference to FIG. 2 may be substantially identical to the server 120 illustrated in FIG. 1.

The server may identify metadata for 3D content including a plurality of viewpoints in operation 210. The identified metadata may be received from the content provider 110 or generated by the server.

The server may transmit the identified metadata in operation 210. The server may transmit the metadata to a device capable of processing data of 3D content (e.g., the electronic device 130).

According to embodiments of the present disclosure, the metadata may include information about at least one grouped viewpoint among the plurality of viewpoints included in the 3D content. In an embodiment, the information about the at least one grouped viewpoint may be provided in the form of a viewpoint alignment box, ViewpointAlignmentBox. The viewpoint alignment box ViewpointAlignmentBox may be included in a projection omnidirectional video box, ProjectedOmniVideoBox. The viewpoint alignment box, ViewpointAlignmentBox provides information about alignment of various viewpoints associated with content which has been configured collectively with multiple viewpoints (i.e. 360 videos) included in multiple tracks of a file (i.e., media data). The viewpoints may be grouped into at least one viewpoint alignment group, each including adjacent viewpoints in the same content scene (e.g., the same physical space (a room, a playground, or a concert hall)). The viewpoint grouping may allow a more flexible viewpoint switching mechanism during switching between viewpoints, aside from an initial viewing orientation mechanism. A viewpoint may be represented by content included in a single track (in the case of single-track delivery) or may include tile-based tracks and may be represented by content represented by all tile tracks (in the case of multi-track delivery). For the syntax of the viewpoint alignment box, ViewpointAlignmentBox, it is assumed that there is a method of identifying various viewpoints in files (e.g., tracks having the same track group identifier (ID) identifying a track group type representing content from the same viewpoint). An exemplary syntax of the viewpoint alignment box, ViewpointAlignmentBox is given as follows.

```
aligned(8) class ViewpointAlignmentBox extends
FullBox('vwpa', 0, 0) {
   ViewpointAlignmentStruct( )
}
aligned(8) class ViewpointAlignmentStruct( ) {
   unsigned int(8) num_alignment_groups;
   for (i = 0; i < num_alignment_groups; i++) {
      bit(7) reserved = 0;
      unsigned int(1) default_viewpoint_id[i];
      unsigned int(8) num_aligned_viewpoints[i];
      for (j = 0; j < num_aligned_viewpoints; j++) {
         unsigned int(32) viewpoint_id[j];
         ViewpointAlignmentOffset( );
      }
   }
}
aligned(8) class ViewpointAlignmentOffset( ) {
   RotationStruct( );
aligned(8) class RotationStruct( ) {
   signed int(32) rotation_yaw;
   signed int(32) rotation_pitch;
   signed int(32) rotation_roll;
}
```

The semantics of each field in the above syntax is described below.

num_alignment_groups: specifies the number of viewpoint alignment groups for which the coordinate axes for all viewpoints in the same group can be aligned.

default_viewpoint_id: specifies the ID of the default viewpoint, to which all viewpoint alignment offsets in the viewpoint alignment group are normalized.

num_aligned_viewpoints: specifies the number of viewpoints for which viewpoint alignment offsets are given within this viewpoint alignment group.

viewpoint_id: specifies the ID of the viewpoint to which the viewpoint alignment offset rotations are given rotation_yaw, rotation_pitch, and rotation_roll: specify the yaw, pitch and roll angles, respectively, of the rotation that is applied to the unit sphere to convert the global coordinate axes of a viewpoint to be aligned with the global coordinates axes of a default viewpoint, in units of $2^{-16}$ degrees. rotation_yaw shall be in the range of $-180 \lambda 2^{16}$ to $180 \times 2^{16}-1$, inclusive. rotation_pitch shall be in the range of $-90 \lambda 2^{16}$ to $90 \times 2^{16}$, inclusive. rotation_roll shall be in the range of $-180 \times 2^{16}$ to $180 \times 2^{16}-1$, inclusive.

The global coordinates of each view point may vary according to camera configurations and settings during capturing content. It is assumed that the global coordinates are not pre-aligned with an arbitrary absolute reference of a real world, such as the global positioning system (GPS) global coordinates. However, the global coordinates are identifiable with respect to the absolute reference of the real world.

The definition of the global coordinates is based on omnidirectional media format (OMAF) v1.

Figure 3:
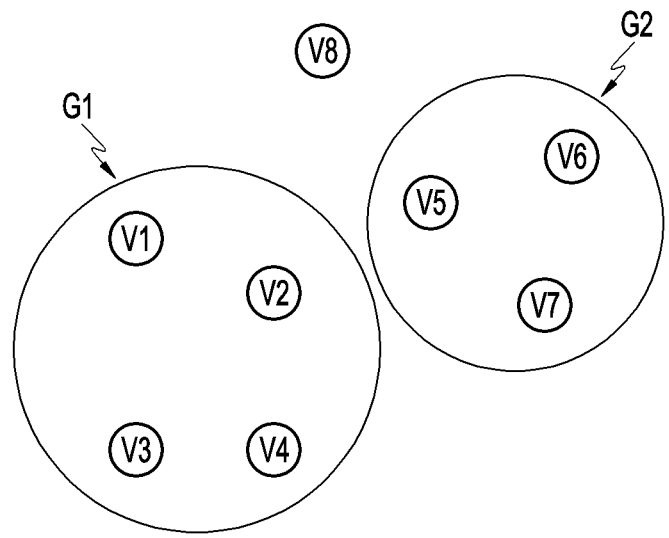
FIG. 3 is a diagram illustrating an exemplary method of grouping a plurality of viewpoints.

Now, a detailed description will be given of a method of grouping a plurality of viewpoints included in 3D content, with reference to FIG. 3. FIG. 3 illustrates an exemplary method of grouping a plurality of viewpoints. 3D content may include a plurality of viewpoints V1, V2 . . . V8. Among the plurality of viewpoints, adjacent viewpoints may be grouped into the same group. For example, adjacent viewpoints V1, V2, V3, and V4 may be grouped into a first group G1, and other adjacent viewpoints V5, V6, and V7 may be grouped into a second group G2. According to some embodiments, at least a part of the plurality of viewpoints included in the 3D content may not be grouped. For example, the viewpoint V8 is excluded from grouping and thus does not belong to any group.

Figure 4:
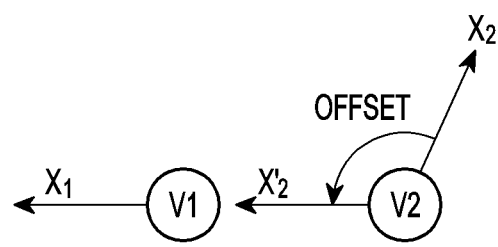
FIG. 4 is a diagram illustrating an exemplary method of aligning a plurality of viewpoints.

With reference to FIG. 4, a method of aligning a plurality of viewpoints included in a group will be described below. FIG. 4 is a diagram illustrating an exemplary method of aligning a plurality of viewpoints. In FIGS. 4, V1 and V2 are reference numerals used for the convenience of description, not necessarily identical to V1 and V2 described before with reference to the foregoing drawing. The same thing applies to the other drawings. Aligning viewpoints with each other may mean aligning the coordinate axes of the viewpoints with each other. Aligning the coordinate axes of viewpoints may mean adjusting the coordinate axes of each of the viewpoints to be parallel to corresponding coordinate axes of the other viewpoints. Viewpoint alignment may take place within a single group. Aligning the coordinate axes of viewpoints may be interpreted as sharing a common reference coordinate system between the viewpoints. In FIGS. 4, V1 and V2 denote viewpoints included in the same viewpoint group. The viewpoint V1 is a default viewpoint in the group. The coordinate axes of the remaining viewpoints except for the viewpoint V1 in the viewpoint group may be aligned with the coordinate axes of the default viewpoint V1. For example, the X axis $X_2$ of the viewpoint V2 may be aligned to be parallel to the X axis $X_1$ of the viewpoint V1. An offset indicating a rotation value for converting the X axis, $X_2$ to the X axis $X_1$ may be included in metadata and provided from the server 120 to the electronic device 130. While the description of FIG. 4 focuses only on X-axis alignment, Y and Z axes may also be aligned in the same manner. The axes of a coordinate system using the yaw, pitch, and roll axes may also be aligned in the same manner as in the coordinate system using the X, Y and Z axes. Offsets for aligning the yaw, pitch, and roll axes have been described before as rotation_yaw, rotation_pitch, and rotation_roll in the viewpoint alignment box, ViewpointAlignmentBox.

As described above, the server 120 may transmit, to the electronic device 130, metadata including information about grouped viewpoints, such as the viewpoint alignment box ViewpointAlignmentBox. The electronic device 130 may identify the grouped viewpoints based on the received metadata, and align the coordinates of the viewpoints of a viewpoint group with respect to the coordinate axes of a default viewpoint in the viewpoint group.

The metadata may further include information about viewpoint switching. In an embodiment, the information about viewpoint switching may be provided in the form of a viewpoint switching mode box ViewpointSwitchingModeBox. The viewpoint switching mode box, ViewpointSwitchingModeBox may be included in the projected omnidirectional video box ProjectedOmniVideoBox. The viewpoint switching mode box, ViewpointSwitchingModeBox provides information about switching modes for various viewpoints associated with content collectively configured with multiple viewpoints (i.e., 360 videos) included in multiple tracks of a file (i.e., media data). A viewpoint may be represented by content included in a single track (in the case of single-track delivery) or may include tile-based tracks and may be represented by content represented by all tile tracks (in the case of multi-track delivery). For the syntax in the viewpoint switching mode box ViewpointSwitchingModeBox, it is assumed that there is a method of identifying various viewpoints in files (e.g., tracks having the same track group ID identifying a track group type representing content from the same viewpoint). An exemplary syntax of the viewpoint switching mode box ViewpointSwitchingModeBox is given as follows.

```
aligned(8) class ViewpointSwitchingModeBox
extends FullBox('vwps', 0, 0) {
    ViewpointModeStruct( )
}
aligned(8) class ViewpointModeStruct( ) {
    unsigned int(8) num_viewpoints;
    for (i = 0; i < num_viewpoints; i++) {
        unsigned int(32) viewpoint_id[i];
        unsigned int(1) los_flag[i];
        if(los_flag == 1) {
            bit(6) reserved = 0;
            unsigned int(1) los_mode;
        }
    }
}
```

Each field of the above syntax has the following semantics.

num_viewpoints: specifies the number of viewpoints for which a switching mode is specified.

viewpoint_id: specifies the ID of the viewpoint for which a switching mode is specified.

los_flag: equal to 0 indicates a non-LoS mode for the viewpoint, and los_flag equal to 1 indicates a LoS mode for the viewpoint.

los_mode: equal to 0 indicates a reverse viewport switching mode for the viewpoint when it is being switched to. los_mode equal to 1 indicates a forward viewport switching mode for the viewpoint when it is being switched to.

In some embodiments, information about viewpoint switching such as the viewpoint switching mode box, ViewpointSwitchingModeBox may be used to provide information about switching between viewpoints in a single viewpoint group. Because the coordinate axes of the viewpoints in the single viewpoint group may be aligned, LoS-mode viewpoint switching may be performed easily in the single viewpoint group.

The LoS mode may refer to a viewpoint switching mode in which the direction of a viewport from a pre-switching viewpoint is set to be identical to the direction of the viewport from a post-switching viewpoint. In some embodiments, when a straight line connecting between viewpoints for switching is parallel to the direction of a viewport from a pre-switching viewpoint, the LoS mode may be set for the viewpoint to be switched. The LoS mode may include both the forward viewport switching mode and the reverse viewport switching mode.

Figure 5:
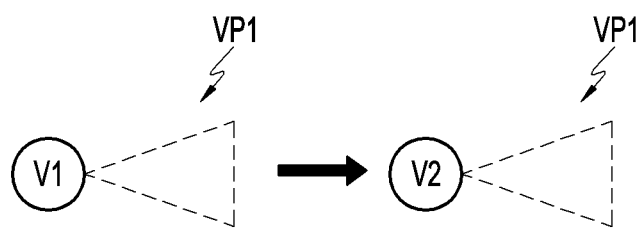
FIG. 5 is a diagram illustrating an exemplary forward viewport switching mode of a line of switching (LoS) mode.

FIG. 5 illustrates an example of the forward viewport switching mode of the LoS mode. In the example of FIG. 5, a viewpoint V1 may be switched to a viewpoint V2. In the forward viewport switching mode, the direction of a viewport VP1 from the viewpoint V1 may be identical to that of a viewport VP2 from the viewpoint V2. That is, the difference between the direction of the viewport VP1 and the direction of the viewport VP2 may be 0°.

Figure 6:
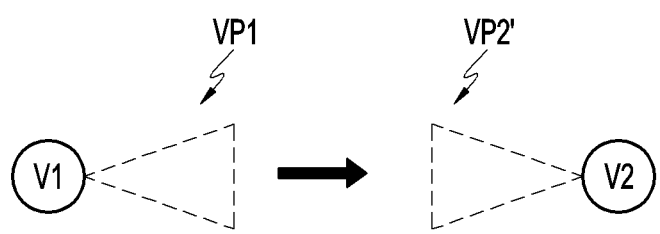
FIG. 6 is a diagram illustrating an exemplary reverse viewport switching mode of the LoS mode.

FIG. 6 illustrates an example of the reverse viewport switching mode of the LoS mode. In the example of FIG. 6, a viewpoint V1 may be switched to a viewpoint V2. In the forward viewport switching mode, the direction of a viewport VP1 from the viewpoint V1 may be opposite to that of a viewport VP2 from the viewpoint V2. That is, the difference between the direction of the viewport VP1 and the direction of the viewport VP2 may be 180°.

Figure 7:
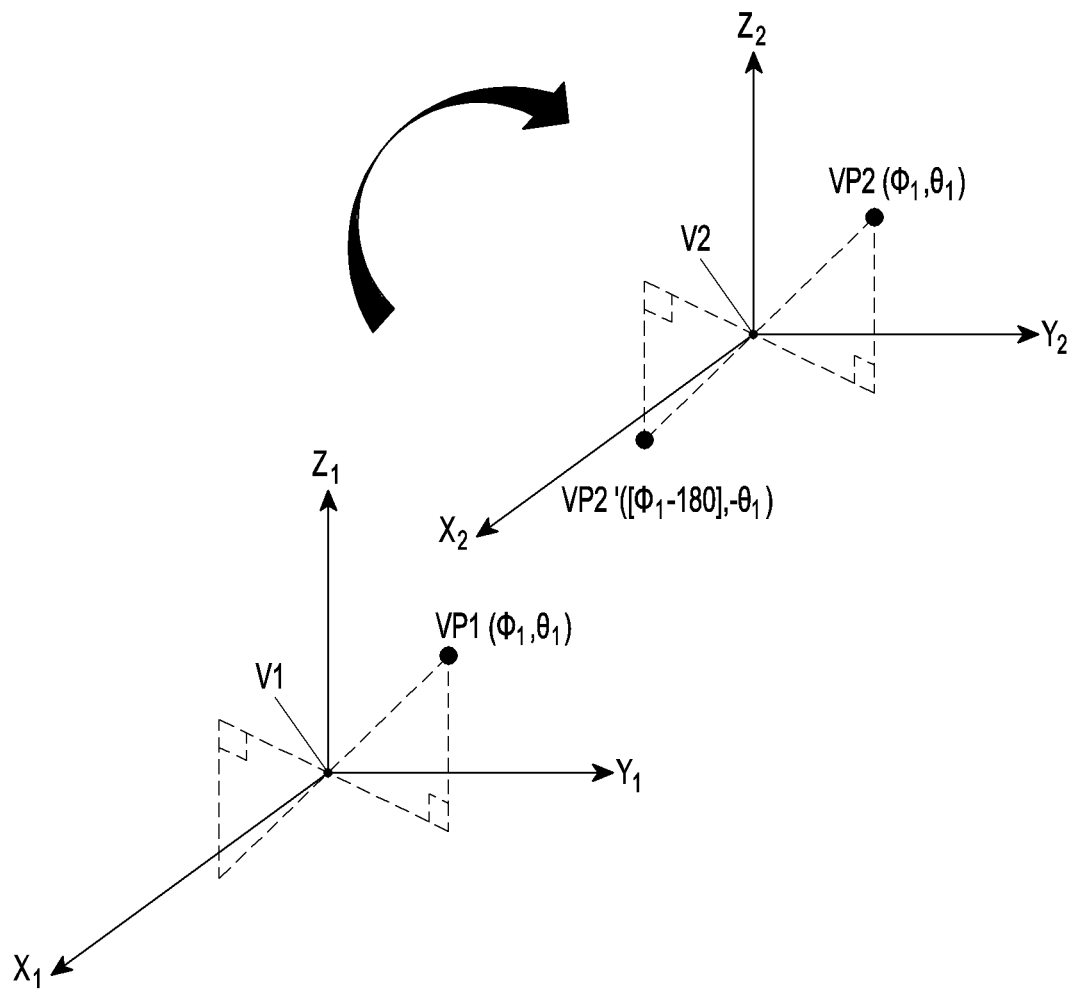
FIG. 7 is a diagram illustrating LoS in a coordinate system.

FIG. 7 illustrates LoS in a coordinate system. The coordinates of the viewport VP1 from the viewpoint V1 may be expressed as $(\varphi_1, \theta 1)$ where $\varphi_1$ represents the azimuth of the viewport VP1 and $\theta_1$ represents the elevation of the viewport VP1. When viewport switching occurs from the viewpoint V1 to the viewpoint V2 in the LoS mode, the viewport VP2 of the viewpoint V2 in the forward viewport switching mode may be represented as $(\varphi_1, \theta_1)$, whereas a viewport VP2' of the viewpoint V2 in the reverse viewport switching mode may be represented as $(\varphi_1-180, -\theta_1)$.

The electronic device 130 may identify for each viewpoint whether the viewpoint switching mode is the LoS mode based on the viewpoint switching mode box, ViewpointSwitchingModeBox included in the received metadata. When the viewpoint switching mode is the LoS mode, the electronic device 130 may identify whether the forward viewport switching mode or the reverse viewport switching mode is applied to the viewpoint. Therefore, the electronic device 130 may perform LoS switching to a specific viewpoint according to the received metadata.

Figure 8:
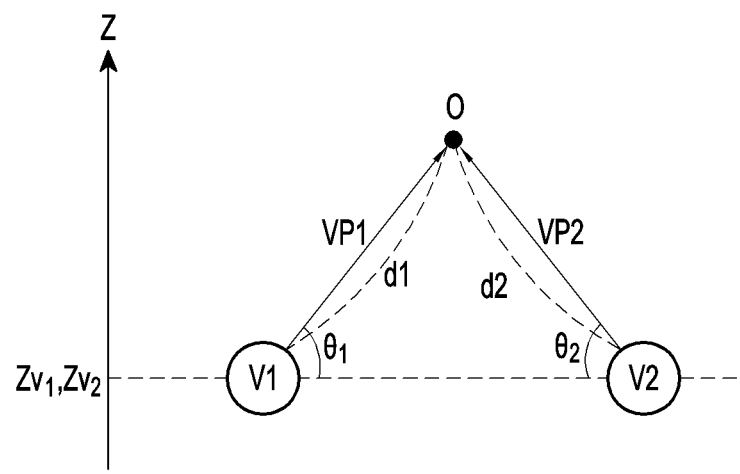
FIGS. 8, 9 and 10 are diagrams illustrating exemplary central estimation-based viewpoint switching.
Figure 9:
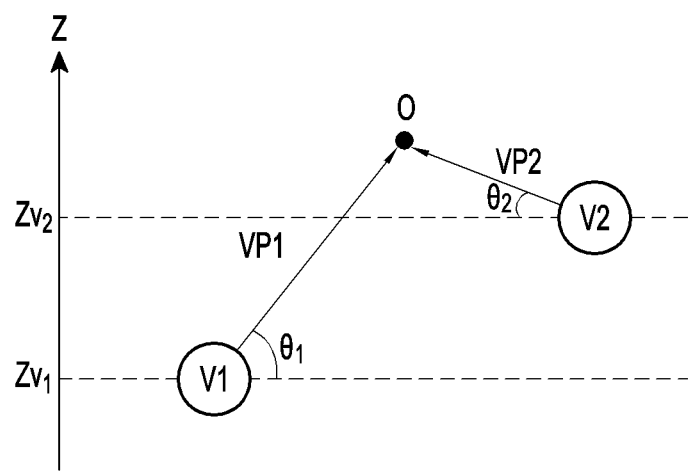
Figure 10:
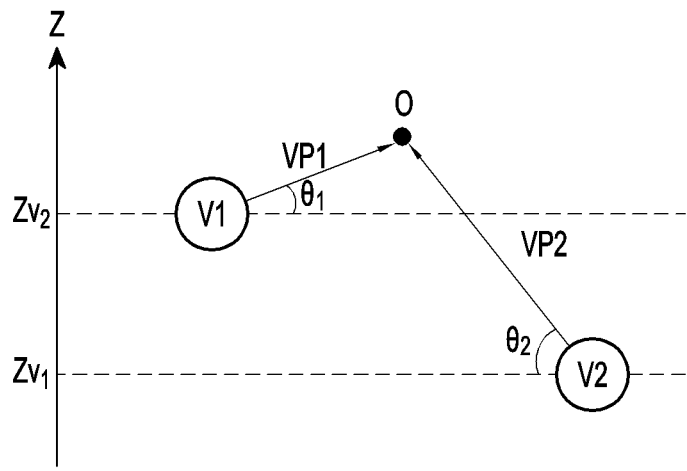

One of the viewpoint switching modes, the non-LoS mode may include a central estimation-based viewpoint switching mode. The central estimation scheme refers to a process of setting a post-switching viewport to be directed toward a target point in the direction of a pre-switching viewport. The target point may be set such that the distance from the pre-switching viewpoint to the target point is equal to the distance from the post-switching viewpoint to the target point. With reference to FIGS. 8, 9 and 10, the central estimation scheme will be described below in greater detail. FIGS. 8, 9 and 10 illustrate exemplary central estimation-based viewpoint switching.

FIG. 8 illustrates an exemplary central estimation scheme for the case in which the Z-axis coordinate $Z_{v1}$ of a viewpoint V1 is identical to the Z-axis coordinate $Z_{v2}$ of a viewpoint V2. A target point O may be located on a viewport VP1 from the viewpoint V1. The distance d1 from the viewpoint V1 to the target point O may be equal to the distance from the viewpoint V2 to the target point O. When the viewpoint V1 is switched to the viewpoint V2, the viewport VP2 may be set to be directed toward the target point O. In this case, the elevation $\theta_1$ of the viewport VP1 from the viewpoint V1 may be equal to the elevation $\theta_2$ of the viewport VP2 from the viewpoint V2. The azimuth of the viewport VP1 from the viewpoint V1 may be different from the azimuth of the viewport VP2 from the viewpoint V2. The azimuth of the viewport VP2 from the viewpoint V2 may be calculated from the coordinates of the viewpoint V1, the coordinates of the viewpoint V2, and the azimuth of the viewport VP1 from the viewpoint V1.

FIG. 9 illustrates an exemplary central estimation scheme for the case in which the Z-axis coordinate $Z_{v1}$ of the viewpoint V1 is smaller than the Z-axis coordinate $Z_{v2}$ of the viewpoint V2. The target point O and the viewport VP2 from the switched viewpoint V2 may be set in the same manner as described with reference to FIG. 8. When viewport switching occurs from the viewpoint V1 to the viewpoint V2, the elevation $\theta_1$ of the viewport VP1 from the viewpoint V1 may be larger than the elevation θ2 of the viewport VP2 from the viewpoint V2. The azimuth of the viewport VP2 from the viewpoint V2 may be calculated from the coordinates of the viewpoint V1, the coordinates of the viewpoint V2, and the azimuth of the viewport VP1 from the viewpoint V1.

FIG. 10 illustrates an exemplary central estimation scheme for the case I which the Z-axis coordinate $Z_{v1}$ of the viewpoint V1 is larger than the Z-axis coordinate $Z_{v2}$ of the viewpoint V2. The target point O and the viewport VP2 from the switched viewpoint V2 may be set in the same manner as described with reference to FIG. 8. When viewport switching occurs from the viewpoint V1 to the viewpoint V2, the elevation θ1 of the viewport VP1 from the viewpoint V1 may be smaller than the elevation $\theta_2$ of the viewport VP2 from the viewpoint V2. The azimuth of the viewport VP2 from the viewpoint V2 may be calculated from the coordinates of the viewpoint V1, the coordinates of the viewpoint V2, and the azimuth of the viewport VP1 from the viewpoint V1.

Figure 11:
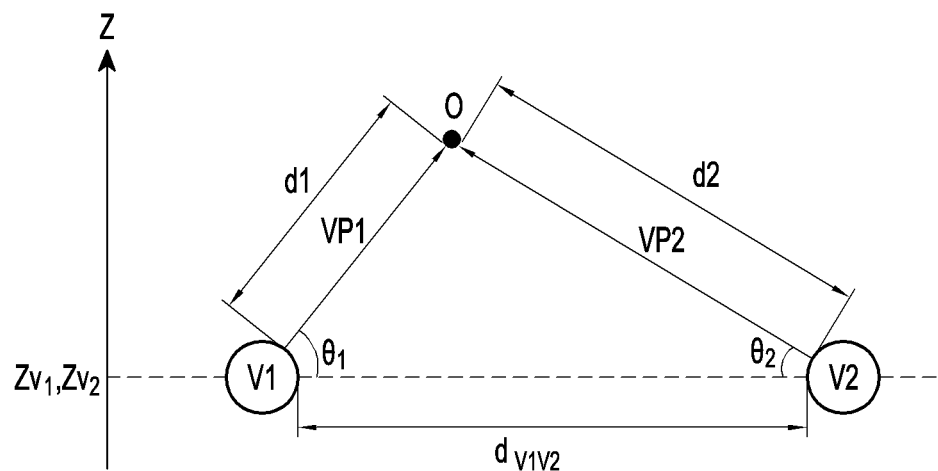
FIGS. 11, 12 and 13 are diagrams illustrating exemplary depth tracking-based viewpoint switching.
Figure 12:
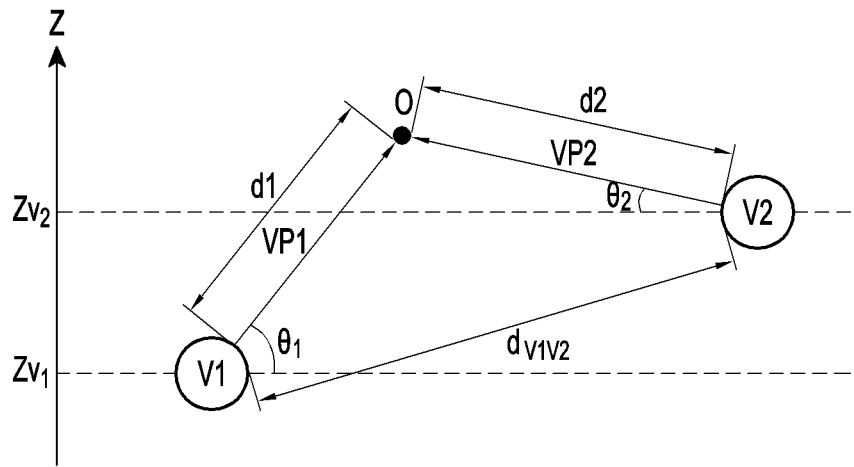
Figure 13:
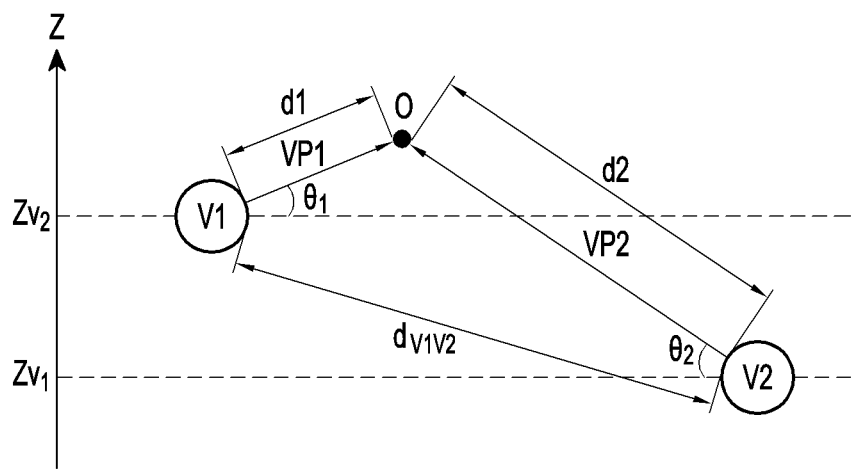

Among the viewpoint switching modes, the non-LoS mode may include a viewpoint switching mode based on depth tracking (content depth-enhanced non-LoS viewpoint switching). In the depth tracking scheme, a point spaced from a pre-switching viewpoint on a pre-switching viewport may be set as a target point, and a post-switching viewport may be set to be directed toward the target point. With reference to FIGS. 11, 12 and 13, depth tracking-based viewpoint switching will be described below. FIGS. 11, 12 and 13 illustrate exemplary depth tracking-based viewpoint switching.

FIG. 11 illustrates an exemplary depth tracking scheme for the case in which the Z-axis coordinate $Z_{v1}$ of the viewpoint V1 is identical to the Z-axis coordinate $Z_{v2}$ of the viewpoint V2. FIG. 12 illustrates an exemplary depth tracking scheme for the case in which the Z-axis coordinate $Z_{v1}$ of the viewpoint V1 is smaller than the Z-axis coordinate $Z_{v2}$ of the viewpoint V2. FIG. 13 illustrates an exemplary depth tracking scheme for the case in which the Z-axis coordinate $Z_{v1}$ of the viewpoint V1 is larger than the Z-axis coordinate $Z_{v2}$ of the viewpoint V2. In the illustrated cases of FIGS. 11, 12 and 13, the target point O may be determined according to a predetermined distance d1 from the viewpoint V1 on the viewport VP2 from the viewpoint V1. The distance d1 from the viewpoint V1 to the target point O may correspond to the depth of a 3D image from the viewpoint V1. When the viewpoint V1 is switched to the viewpoint V2, the viewport VP2 from the viewpoint V2 may be set to be directed toward the target point O. The elevation $\theta_2$ of the viewport VP2 from the viewpoint V2 and the distance d2 from the target point V2 to the target point O may be calculated from the distance d1 from the viewpoint V1 to the target point O, the distance $d_{v1v2}$ between the viewpoints V1 and V2, and the elevation θ1 of the viewport VP1 from the viewpoint V1 by triangulation. The azimuth of the viewport VP1 from the viewpoint V1 and the azimuth of the viewport VP2 from the viewpoint V2 may be different. The azimuth of the viewport VP2 from the viewpoint V2 may be calculated from the coordinates of the viewpoint V1, the coordinates of the viewpoint V2, and the azimuth of the viewport VP1 from the viewpoint V1.

In the depth tracking-based LoS mode, metadata may include additional information indicating a content depth. An exemplary syntax and semantics of the additional information are given as follows.

unsigned(64)viewpoint_depth;

viewpoint_depth: specifies the depth, in the same units as used by the common reference coordinate system, of content of interest surrounding the viewpoint, such that it can be used for a content depth enhanced non line of sight viewpoint switching between two viewpoints.

In some embodiments, metadata may include a box containing both of information about grouped viewpoints and information for viewpoint alignment. In some embodiments, the viewpoint alignment box, ViewpointAlignmentBox may include both of the information about grouped viewpoints and the information for viewpoint alignment. An exemplary syntax of the viewpoint alignment box, ViewpointAlignmentBox is given as follows.

```
aligned(8) class ViewpointAlignmentBox extends FullBox
('vwpa', 0, 0) {
    ViewpointAlignmentStruct( )
}
aligned(8) class ViewpointAlignmentStruct( ) {
    unsigned int(8) num_alignment_groups;
    for (i = 0; i < num_alignment_groups; i++) {
        unsigned int(32) alignment_group_id[j];
        unsigned int(32) default_viewpoint_id[i];
        unsigned int(8) num_aligned_viewpoints[i];
        unsigned int(1) alignment_group_content_coverage_flag;
        unsigned int(1) alignment_group_initial_orientation_flag;
        if(alignment_group_initial_orientation_flag == 1) {
            signed int(32) center_x;
            signed int(32) center_y;
            signed int(32) center_z;
        }
        for (j = 0; j < num_aligned_viewpoints; j++) {
            unsigned int(32) viewpoint_id[j];
            ViewpointAlignmentOffset( );
            SphereRegionStruct(0);
            unsigned int(64) Depth( );
            OR
            signed int(32) center_x;
            signed int(32) center_y;
            signed int(32) center z;
            unsigned int(8) viewpoint_switch_mode;
            if(alignment_group_content_coverage_flag ==1) {
                SphereRegionStruct(1);
            }
        }
    }
}
aligned(8) class ViewpointAlignmentOffset( ) {
    RotationStruct( );
aligned(8) class RotationStruct()(
    signed int(32) rotation_yaw;
    signed int(32) rotation_pitch;
    signed int(32) rotation_roll;
}
```

Among the fields of the above syntax, the fields which have not been described before have the following semantics.

alignment_group_id: specifies the ID of the alignment group, containing viewpoints whose alignment offsets are normalized.

alignment_group_content_coverage_flag: alignment_group_content_coverage_flag equal to 0 specifies that the alignment group content coverage information is not present. alignment_group_content_coverage_flag equal to 1 specifies that the alignment group content coverage information is present, representing sphere regions from multiple viewpoints in the group covered by the same part of the content scene.

alignment_group_initial_orientation_flag: alignment_group_initial_orientation_flag equal to 0 specifies that the alignment group initial orientation information is not present. alignment_group_initial_orientation_flag equal to 1 specifies that the alignment group initial orientation information is present, represented by a center x, y, z location relative to the alignment group coordinates.

viewpoint_switch_mode: specifies the mode of the viewport orientation change during viewpoint switching.

viewpoint_switch_mode set to 0 is a default indicating forward LoS. The OMAF player (e.g., the electronic device 130) is expected to keep the same viewing orientation as in the switching-from a viewpoint just before the switching occurs.

viewpoint_switch_mode set to 1 indicates backward LoS. The OMAF player is expected to change the viewpoint orientation such that it is reverse to the viewport orientation in the switching-from viewpoint.

viewpoint_switch_mode set to 2 indicates central non-LoS. The OMAF player is expected to change the viewport orientation such that it corresponds to a centrally estimated viewport orientation which includes the same content (albeit from a new viewpoint) as in the viewport from the switching-from viewpoint.

In viewpoint_switch_mode set to 3, the OMAF player is expected to change the viewport orientation such that it corresponds to the global coordinates as specified by the group initial orientation of the viewpoint.

The values of 4 to 255 for viewpoint_switch_mode are reserved.

In some embodiments, the metadata may further include a viewpoint list box, OMAFViewpointListBox for a list of viewpoint IDs and a hint as to where to find corresponding information metadata for viewpoints. The viewpoint list box OMAFViewpointListBox may be defined in a meta box 'meta' included in a movie box 'moov'. An exemplary syntax of the viewpoint list box, OMAFViewpointListBox is given as follows.

```
aligned(8) class OMAFViewpointListBox extends Box('vpli') {
    unsigned int(8) num_viewpoints;
    for (i = 0; i < num_viewpoints; i++) {
        bit(6) reserved = 0;
        unsigned int(32) viewpoint_id;
        unsigned int(1) initial_viewpoint_flag;
        unsigned int(1) viewpoint_delivery_type_flag;
        if(viewpoint_delivery_type_flag == 0)
            unsigned int(32) track_ID;
        }
        if (viewpoint_delivery_type_flag == 1)
            unsigned int(32) track_group_ID;
        }
}
```

A viewpoint may be represented by one track only or a collective group of tracks, each including a part of 360 video viewpoints. A viewpoint ID is assigned to each viewpoint. The viewpoint ID may be independent of track IDs. However, there should be a form of association for referencing and linking the ID of a viewpoint and a track carrying content. The simplest method may be to map track IDs to the IDs of single track-delivered viewpoints. A track group ID may be used for a multi-track-delivered viewpoint. Depending on whether a viewpoint is delivered in a single track or multiple tracks, the viewpoint ID of the viewpoint may correspond to either 1) a track ID or 2) a track group ID.

The semantics of the fields used in the above syntax are given as follows.

num_viewpoints: specifies the number of viewpoints present in a file.

viewpoint_id: indicates the unique ID of this viewpoint. Depending on the value of viewpoint_delivery_type_flag, viewpoint_id is equal either track_id or track_group_id.

initial_viewpoint_flag: initial_viewpoint_flag equal to 1 indicates the viewpoint as the initial/default viewpoint to be played back when playing back a file containing multiple viewpoints. This flag should be equal to 1 for one and only one viewpoint.

viewpoint_delivery_type_flag: viewpoint_delivery_type_flag equal to 0 specifies that a viewpoint is carried via a single track, and the value for its viewpoint_id is equal to its track_id. viewpoint_delivery_type_flag equal to 1 specifies that the viewpoint is carried via multiple tracks, and the value for its viewpoint_id is equal to the track_group_id of the collective group of tracks which belong to the same viewpoint, withtrack_group_type equal to 'vipo'.

A new box "vpin" (OMAFViewpointInformationBox) may be defined in a 'meta' box contained in a track box 'trak', for transmission of single-track viewpoint information metadata. If any viewpoint is specified as having viewpoint_delivery_type_flag equal to 0 in a viewpoint list box 'vpli', the viewpoint information box, OMAFViewpointInformationBox should exist in the meta box included in the track box for a track corresponding to the viewpoint. An exemplary syntax of the viewpoint information box, OMAFViewpoinfinformationBox is given as follows.

```
aligned(8) class OMAPViewpointInfoBox extends Box('vpin') {
    unsigned int(32) viewpoint_id;
    ViewpointInfoStruct( )
}
aligned(8) ViewpointInfoStruct( ) {
    ViewpointPosStruct( );
    ViewpointGlobalCoordinateSysRotationStruct( );
    unsigned int(8) viewpoint_switch_mode;
    string viewpoint_description;
}
aligned(8) ViewpointPosStruct( ) {
    signed int(32) viewpoint_pos_x;
    signed int(32) viewpoint_pos_y;
    signed int(32) viewpoint_pos_z;
}
aligned(8) class ViewpointGlobalCoordinateSysRotationStruct( ) {
    signed int(32) viewpoint_gcs_yaw;
    signed int(32) viewpoint_gcs_pitch;
    signed int(32) viewpoint_gcs_roll;
```

The semantics of the above syntax is given as follows.

viewpoint_id: indicates the unique ID of the viewpoint. When included in this box 'vpin', viewpoint_id is always equal to the track_id of the track containing it.

viewpoint_switch_mode: specifies the mode of the viewport orientation change during a viewpoint switch from a previous viewpoint to this viewpoint, in the absence of initial viewing orientation metadata. Contents indicated by the values of viewpoint_switch_mode are described below.

viewpoint_switch_mode set to 0 indicates forward LoS as a default. The OMAF player (e.g., the electronic device 130) is expected to keep the same viewing orientation as in the switching-from viewpoint just before the switching occurs.

viewpoint_switch_mode set to 1 indicates backward LoS. The OMAF player is expected to change the viewpoint orientation such that it is reverse to the viewport orientation in the switching-from viewpoint.

viewpoint_switch_mode set to 2 indicates central non-LoS. The OMAF player is expected to change the viewport orientation such that it corresponds to a centrally estimated viewport orientation which includes the same content (albeit from a new viewpoint) as in the viewport from the switching-from viewpoint.

viewpoint_switch_mode set to 3 indicates alignment group initial orientation switching. The OMAF player is expected to change the viewport orientation such that it corresponds to the point as specified by the alignment group initial orientation of the viewpoint.

The values of 4 to 255 for viewpoint_switch_mode are reserved.

When a user switches between two different viewpoints, switching between the orientations of viewports before and after the viewpoint switching depends on the locations and content of related viewpoints. Therefore, there may be multiple viewpoint switching modes for a viewport, including a plurality of switching modes such as forward LoS, reverse LoS, center (-estimated) non-LoS, and content depth-enhanced non-LoS.

In some embodiments, metadata for content including a plurality of viewpoints may further include the following fields.

viewpoint_description: viewpoint_description is a null-terminated UTF-8 string that provides a textual description of the viewpoint.

viewpoint_pos_x, viewpoint_pos_y, and viewpoint_pos_z: specify the position of the viewpoint (X coordinate value, Y coordinate value, Z coordinate value) in units of millimeters in a 3D space with (0,0,0) as the center of a reference coordinate system.

viewpoint_gcs_yaw, viewpoint_gcs_pitch, and viewpoint_gcs_roll: specify the yaw, pitch, and roll angles, respectively, of the rotation angles of the X, Y, and Z axes of the global coordinate system of the viewpoint relative to the reference coordinate system, in units of $2^{-16}$ degrees. viewpoint_gcs_yaw shall be in the range of $-180\times2^{16}$ to $180\times2^{16}-1$, inclusive. viewpoint_gcs_pitch shall be in the range of $-90\times2^{16}$ to $180\times2^{16}$ inclusive. viewpoint_gcs_roll shall be in the range of $-180\times2^{16}$ to $180\times2^{16}-1$, inclusive.

In some embodiments, a track group type "vipo" may be defined. Tracks containing the same value as track_group_id in TrackGroupTypeBox having the same track_group_type as "vipo" are a collective group of tracks belonging to the same viewpoint. When any viewpoint is specified as having viewpoint_delivery_type_flag equal to 1 in ViewpointList-Box "vpli", there should be TrackGroupTypeBox having the same value as track_group_type identical to "vipo" and track_group_id in all tracks belonging to the same viewpoint. Bit 0 (the least significant bit (LSB)) of each of the flags of TrackGroupTypeBox is used to indicate the uniqueness of track_group_id. A related exemplary syntax is given as follows.

```
aligned(8) class ViewpointBox extends TrackGroupTypeBox
('vipo') {
    // track_group_id is inherited from TrackGroupTypeBox;
    unsigned int(32) viewpoint_id;
    ViewpointInfoStruct( )
}
aligned(8) ViewpointInfoStruct( ) {
    ViewpointPosStruct( );
    ViewpointGlobalCoordinateSysRotationStruct();
    unsigned int(8) viewpoint_switch_mode;
    string viewpoint_description;
}
aligned(8) ViewpointPosStruct( ) {
    signed int(32) viewpoint_pos_x;
    signed int(32) viewpoint_pos_y;
    signed int(32) viewpoint_pos_z;
}
aligned(8) class ViewpointGlobalCoordinateSysRotationStruct( ) {
    signed int(32) viewpoint_gcs_yaw;
    signed int(32) viewpoint_gcs_pitch;
    signed int(32) viewpoint_gcs_roll;
}
```

The semantics of the above syntax is given as follows.

viewpoint_id: indicates the unique ID of this viewpoint. When content for the viewpoint is carried in a collective group of tracks, viewpoint_id corresponds to the same value as track_group_id contained together in the same Track-GroupTypeBox.

viewpoint_switch_mode: In the absence of initial viewing orientation metadata, where both viewpoints belong to the same alignment group, it specifies the mode of the viewport orientation change during a viewpoint switch from a previous viewpoint to this viewpoint. The specific meanings of the values of viewpoint_switch_mode have been described before in relation to OMAFViewpointInformationBox.

viewpoint_description: viewpoint_description is a null-terminated UTF-8 string that provides a textual description of the viewpoint.

viewpoint_pos_x, viewpoint_pos_y, and viewpoint_pos_z: specify the position of the viewpoint (X coordinate value, Y coordinate value, Z coordinate value) in units of millimeters in a 3D space with (0,0,0) as the center of the reference coordinate system.

viewpoint_gcs_yaw, viewpoint_gcs_pitch, and viewpoint_gcs_roll: specify the yaw, pitch, and roll angles, respectively, of the rotation angles of the X, Y, and Z axes of the global coordinate system of the viewpoint relative to the reference coordinate system, in units of $2^{-16}$ degrees. viewpoint_gcs_yaw shall be in range of $-180\times2^{16}$ to $180\times2^{16}-1$, inclusive. viewpoint_gcs_pitch shall be in range of $-90\times2^{16}$ to $180\times2^{16}$, inclusive. viewpoint_gcs_roll shall be in range of $-180\times2^{16}$ to $180\times2^{16}-1$, inclusive.

In some embodiments, a new track group type "algr" may be defined. Tracks including the value of track_group_id in TrackGroupTypeBox having the same track_group_type as "algr" are a collective group of tracks belonging to the same alignment group. Bit 0 (bit 0 is the LSB) of each of the flags of TrackGroupTypeBox is used to indicate the uniqueness of track_group_id. An exemplary related syntax is given as follows.

```
aligned(8) class AlignmentGroupBox extends
TrackGroupTypeBox('algr') {
    // track_group_id is inherited from TrackGroupTypeBox;
    AlignmentGroupInfoStruct( )
}
aligned(8) AlignmentGroupInfoStruct( ) {
    bit(6) reserved = 0;
    unsigned int(32) alignment_group_id;
    unsigned int(1) group_common_reference_flag;
    unsigned int(1) alignment_group_initial_orientation_flag;
    if(alignment_group_initial_orientation_flag == 1) {
```

```
    signed int(32) centre_x;
    signed int(32) centre_y;
    signed int(32) centre_z;
  }
  string group_description;
}
```

Content may have multiple viewpoints, some of which may be captured in different scenes and locations. If all viewpoints are aligned in the same reference coordinate system, certain viewpoint positions may be irrational for representation in viewpoint position metadata. Viewpoint position metadata is mainly used to have coordinated viewport switching, when switching occurs between two viewpoints. In some situations, it may be desirable to group the viewpoints such that viewpoints are aligned with respect to other viewpoints only within the same group, and viewpoints that do not belong to the same arrangement group are not aligned with each other.

group_common_reference_flag is used to indicate whether the viewpoints of the alignment group are globally or locally aligned with respect to the alignment group.

Even though any viewpoint is selected for switching in a group, initial orientation may be set for alignment groups as a whole by defining alignment groups containing a group of viewpoints, such that a client device may display a viewpoint corresponding to the center X, Y, Z point defined in space in the reference coordinate system. The alignment grouping mechanism described above may use a track grouping design without the need for explicitly specifying any viewpoint ID. Further, it is possible to simply list a set of viewpoints that use viewpoint IDs to define an alignment group by using the track grouping mechanism. It is possible to directly identify whether a track belongs to the same alignment group by its track_group_id (because track_group_id is unique) without the need for identifying its viewpoint_id first of all. The viewpoint_id of the track may be individually known through one of a track group type box having the same group type as 'vipo', an OMAF viewpoint information box, or an OMAR viewpoint list box.

The semantics of the above syntax is given as follows.

alignment_group_id: indicates the unique ID for this alignment group. alignment_group_id typically corresponds to the same value as track_group_id contained together in the same TrackGroupTypeBox.

group_common_reference_flag: group_common_reference_flag equal to 0 specifies that the viewpoints belonging to this alignment group are aligned to a global common reference coordinate system. group_common_reference_flag specifies that the viewpoints belonging to this alignment group are aligned to a local common reference coordinate system unique to this alignment group.

alignment_group_initial_orientation_flag: alignment_group_initial_orientation_flag equal to 0 specifies that alignment group initial orientation information is not present. alignment_group_initial_orientation_flag equal to 1 specifies that the alignment group initial orientation information is present, represented by a point location specified as centre_x, centre_y, and centre_z relative to the common reference coordinate system used by the alignment group.

Various exemplary information, boxes, fields, and parameters that may be included in metadata have been described above. However, the names of boxes, fields, and parameters are only examples, and those skilled in the art are will apparently understand that the names may be freely changed while maintaining the essential properties of the fields and parameters. Further, it will be apparent to those skilled in the art that mapping of values and attributes to fields and parameters may be changed according to selection. The metadata may be configured to include all or at least one selected one of the exemplary boxes described above. Each of the boxes described above may be configured to include all or at least one selected one of the fields described in relation to the corresponding box.

Figure 14:
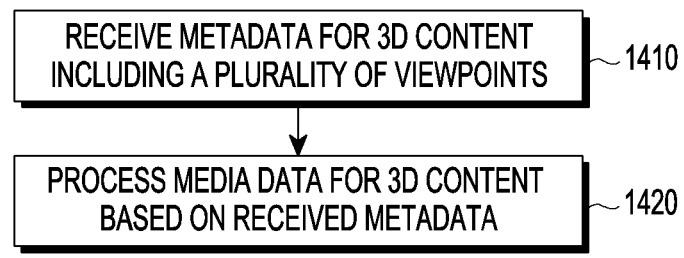
FIG. 14 is a flowchart illustrating an operation of an electronic device according to an embodiment of the present disclosure.

FIG. 14 is a flowchart illustrating an operation of an electronic device according to an embodiment of the present disclosure. The electronic device 130 may receive metadata for 3D content including a plurality of viewpoints in operation 1410. The metadata received at the electronic device 130 may be transmitted from the afore-described server 120.

The electronic device 130 may process media data for the 3D content based on the received metadata in operation 1420. The media data for the 3D content may be transmitted along with or separately from the metadata from the server 120. In some embodiments, the electronic device 130 may receive the media data from a server different from the server 120 which transmits the metadata. According to some embodiments, the electronic device 130 may receive the media data from a server of the content provider 110. According to some embodiments, the electronic device 130 may obtain the media data from a storage device such as a compact disk read-only memory (CD-ROM), a digital versatile disk read-only memory (DVD-ROM), a hard disk, a floppy disk, or a universal serial bus (USB) storage device. The electronic device 130 may play back the 3D content on a display included in the electronic device 130 by processing the media data for the 3D content based on the received metadata. In some embodiments, the electronic device 130 may transmit a signal for reproducing the 3D content (a video signal and an audio signal) on a display outside of the electronic device 130 to another electronic device having the display.

Figure 15:
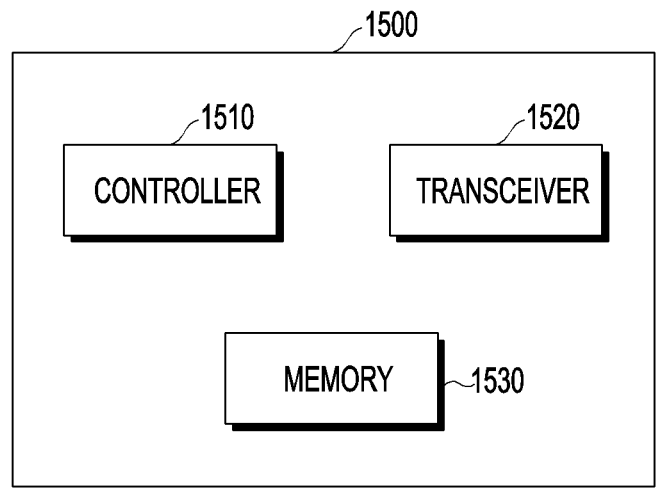
FIG. 15 is a block diagram of a server according to an embodiment of the present disclosure.

FIG. 15 is a block diagram illustrating a server according to an embodiment of the present disclosure. A server 1500 may be identical to the server 120 illustrated in FIG. 1. The server 1500 may include a controller 1510, a transceiver 1520, and a memory 1530.

The controller 1510 may perform computations and functions required for operations of the server 1500. The controller 1510 may be connected to elements of the server 1500, including the transceiver 1520 and the memory 1530 and control operations of the elements. Therefore, the operations of the server 1500 may be interpreted as performed substantially by the controller 1510. The controller 1510 may be configured with at least one processor.

The server 1500 may communicate with other entities through the transceiver 1520. The transceiver 1520 may include wired or wireless communication interfaces. The transceiver 1520 may conduct communication by known wired or wireless communication protocols such as wireless fidelity (Wi-Fi), long term evolution (LTE), code division multiple access (CDMA), worldwide interoperability for microwave access (Wi-MAX), wireless broadband (Wi-Bro), and USB.

The memory 1530 may include information required for operations of the server 1500 and the controller 1510. For example, the memory 1530 may store temporary or non-temporary data required for computations of the controller 1510. The memory 1530 may store instructions executable by the controller 1510. The memory 1530 may be configured to include at least one of a transitory memory, a non-transitory memory, a rewritable memory, or a non-rewritable memory.

Figure 16:
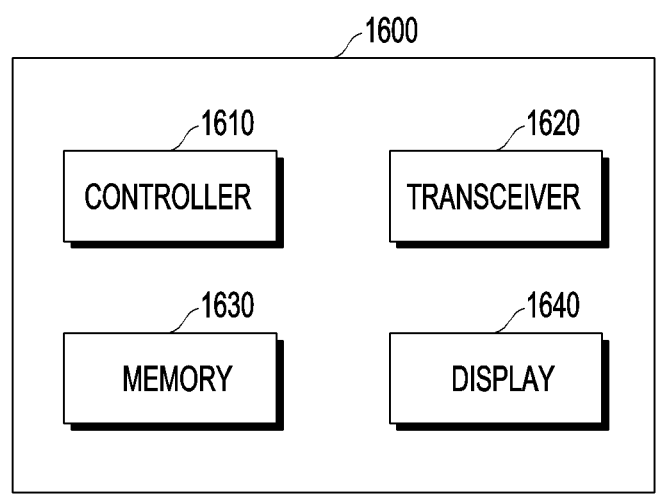
FIG. 16 is a block diagram of an electronic device according to an embodiment of the present disclosure.

FIG. 16 is a block diagram illustrating an electronic device according to an embodiment of the present disclosure. An electronic device 1600 may be substantially identical to the electronic device 130 illustrated in FIG. 1. The electronic device 1600 may include a controller 1610, a transceiver 1620, a memory 1630, and a display 1640.

The description of the controller 1610, the transceiver 1620, and the memory 1630 is substantially identical to that of the controller 1510, the transceiver 1520, and the memory 1530 of the server 1500, and thus will not be provided herein.

The display 1640 may reproduce 3D content under the control of the controller 1610. According to some embodiments, the electronic device 1600 may reproduce the 3D content on a display of another electronic device, instead of the display 1640. According to some embodiments, the electronic device 1600 may not include the display 1640.

While the embodiments of the present disclosure have been described above with reference to the attached drawings, those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive.

The invention claimed is:

1. A method for transmitting metadata for omnidirectional content including a plurality of viewpoints, the method comprising:
   identifying the metadata for the omnidirectional content including the plurality of viewpoints; and
   transmitting the identified metadata,
   wherein the metadata comprises:
      information about an identifier (ID) of a viewpoint group including at least one viewpoint of the plurality of viewpoints, wherein the at least one viewpoint in the viewpoint group shares a common reference coordinate system; and
      information indicating yaw, pitch, and roll rotation angles, respectively, of X, Y, and Z axes of a global coordinate system of a viewpoint of the plurality of viewpoints, relative to the common reference coordinate system.

2. The method of claim 1, wherein the metadata further comprises information about a description of the viewpoint group.

3. The method of claim 1, wherein the metadata further comprises information indicating position of the viewpoint of the plurality of viewpoints in the common reference coordinate system.

4. The method of claim 1, wherein the metadata further comprises information indicating a viewpoint switching mode for a viewpoint to be switched, when switching occurs between viewpoints in the viewpoint group, and
   wherein the information indicating the viewpoint switching mode indicates one of a forward line of sight (LoS) mode, a backward LoS mode, a central estimation-based non-LoS mode, or an alignment group initial orientation switching mode.

5. The method of claim 1,
   wherein the metadata further comprises information about an ID of each of the at least one viewpoint in the viewpoint group, and
   wherein when media data for a viewpoint corresponding to the ID of each of the at least one viewpoint is carried in a collective group of tracks, the ID is set to be identical to an ID of the collective group of tracks.

6. A method for processing information about omnidirectional content including a plurality of viewpoints, the method comprising:
   receiving metadata for the omnidirectional content including the plurality of viewpoints; and
   processing media data for the omnidirectional content based on the received metadata,
   wherein the metadata comprises:
      information about an identifier (ID) of a viewpoint group including at least one viewpoint of the plurality of viewpoints, wherein the at least one viewpoint in the viewpoint group shares a common reference coordinate system, and
      information indicating yaw, pitch, and roll rotation angles, respectively, of X, Y, and Z axes of a global coordinate system of a viewpoint of the plurality of viewpoints, relative to the common reference coordinate system.

7. The method of claim 6, wherein the metadata further comprises information about a description of the viewpoint group.

8. The method of claim 6, wherein the metadata further comprises information indicating position of the viewpoint of the plurality of viewpoints in the common reference coordinate system.

9. The method of claim 6,
   wherein the metadata further comprises information indicating a viewpoint switching mode for a viewpoint to be switched, when switching occurs between viewpoints in the viewpoint group, and
   wherein the information indicating the viewpoint switching mode indicates one of a forward line of sight (LoS) mode, a backward LoS mode, a central estimation-based non-LoS mode, or an alignment group initial orientation switching mode.

10. The method of claim 6,
   wherein the metadata further comprises information about an ID of each of the at least one viewpoint in the viewpoint group, and
   wherein when media data for a viewpoint corresponding to the ID of each of the at least one viewpoint is carried in a collective group of tracks, the ID is set to be identical to an ID of the collective group of tracks.

11. An apparatus for transmitting metadata for omnidirectional content including a plurality of viewpoints, the apparatus comprising:
   a transceiver; and
   a controller coupled to the transceiver,
   wherein the controller is configured to:
      identify the metadata for the omnidirectional content including the plurality of viewpoint, and
      transmit the identified metadata,
   wherein the metadata comprises:
      information about an identifier (ID) of a viewpoint group including at least one viewpoint of the plurality of viewpoints, wherein the at least one viewpoint in the viewpoint group shares a common reference coordinate system, and
      information indicating yaw, pitch, and roll rotation angles, respectively, of X, Y, and Z axes of a global coordinate system of a viewpoint of the plurality of viewpoints, relative to the common reference coordinate system.

12. The apparatus of claim 11, wherein the metadata further comprises information indicating position of the viewpoint of the plurality of viewpoints in the common reference coordinate system.

13. The apparatus of claim 11,
wherein the metadata further comprises information indicating a viewpoint switching mode for a viewpoint to be switched, when switching occurs between viewpoints in the viewpoint group, and
wherein the information indicating the viewpoint switching mode indicates one of a forward line of sight (LoS) mode, a backward LoS mode, a central estimation-based non-LoS mode, or an alignment group initial orientation switching mode.

14. An apparatus for processing information about omnidirectional content including a plurality of viewpoints, the apparatus comprising:
a transceiver; and
a controller coupled to the transceiver,
wherein the controller is configured to:
receive the for the omnidirectional content including the plurality of viewpoint, and
process media data for the omnidirectional content based on the received metadata,
wherein the metadata comprises:
information about an identifier (ID) of a viewpoint group including at least one viewpoint of the plurality of viewpoints, wherein the at least one viewpoint in the viewpoint group shares a common reference coordinate system, and
information indicating yaw, pitch, and roll rotation angles, respectively, of X, Y, and Z axes of a global coordinate system of a viewpoint of the plurality of viewpoints, relative to the common reference coordinate system.

15. The apparatus of claim 14, wherein the metadata further comprises information indicating position of the viewpoint of the plurality of viewpoints in the common reference coordinate system.

16. The apparatus of claim 14,
wherein the metadata further comprises information indicating a viewpoint switching mode for a viewpoint to be switched, when switching occurs between viewpoints in the viewpoint group, and
wherein the information indicating the viewpoint switching mode indicates one of a forward line of sight (LoS) mode, a backward LoS mode, a central estimation-based non-LoS mode, or an alignment group initial orientation switching mode.

* * * * *